(12) United States Patent
Zheng

(10) Patent No.: US 10,594,765 B2
(45) Date of Patent: Mar. 17, 2020

(54) PAGE JUMP METHOD AND APPARATUS

(71) Applicant: Alibaba Group Holding Limited, George Town (KY)

(72) Inventor: Yueyang Zheng, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 15/989,678

(22) Filed: May 25, 2018

(65) Prior Publication Data
US 2018/0278671 A1 Sep. 27, 2018

Related U.S. Application Data

(63) Continuation of application No. PCT/CN2016/106346, filed on Nov. 18, 2016.

(30) Foreign Application Priority Data

Nov. 27, 2015 (CN) .......................... 2015 1 0894292

(51) Int. Cl.
| | | |
|---|---|---|
| *G06F 15/16* | (2006.01) | |
| *H04L 29/08* | (2006.01) | |
| *G06F 16/955* | (2019.01) | |
| *G06F 16/23* | (2019.01) | |
| *G06F 9/44* | (2018.01) | |

(52) U.S. Cl.
CPC .............. *H04L 67/02* (2013.01); *G06F 9/44* (2013.01); *G06F 16/2379* (2019.01); *G06F 16/955* (2019.01)

(58) Field of Classification Search
CPC .............. H04L 67/02; G06F 17/30377; G06F 17/30876; G06F 16/2379; G06F 16/955; G06F 9/44
See application file for complete search history.

(56) References Cited

U.S. PATENT DOCUMENTS

| | | | |
|---|---|---|---|
| 9,742,900 B2 * | 8/2017 | Liu | .................... H04M 1/72561 |
| 2007/0083524 A1 | 4/2007 | Fung et al. | |
| 2009/0094199 A1 * | 4/2009 | Hawkins | ............... G06F 16/958 |

(Continued)

FOREIGN PATENT DOCUMENTS

| | | |
|---|---|---|
| CN | 101217630 | 7/2008 |
| CN | 101369284 | 2/2009 |

(Continued)

OTHER PUBLICATIONS

International Search Report issued by the International Searching Authority in International Application No. PCT/CN2016/106346 dated Feb. 17, 2017; 9 pages.

(Continued)

*Primary Examiner* — Cheikh T Ndiaye

(74) *Attorney, Agent, or Firm* — Fish & Richardson P.C.

(57) ABSTRACT

A request for a service is received. A page associated with the requested service is determined. The page is associated with a page identifier. In response to determining the page associated with the requested service, a first jump route from a page routing table is retrieved based on the page identifier. The first jump route associates the page identifier to a first jump page. In response to retrieving the first jump route, the first jump page is loaded based on the first jump route.

20 Claims, 5 Drawing Sheets

```
┌─────────────────────────────────────────────────────────┐
│ Obtain a page identifier of a page to be jumped from   │─ 101
└─────────────────────────────────────────────────────────┘
                             │
                             ▼
┌─────────────────────────────────────────────────────────┐
│ Search a page routing table for a corresponding jump    │
│ route based on the obtained page identifier, where the  │─ 102
│ jump route includes a mapping relationship between the  │
│ page identifier and a jump page                         │
└─────────────────────────────────────────────────────────┘
                             │
                             ▼
┌─────────────────────────────────────────────────────────┐
│ Jump to the jump page based on the identified jump route│─ 103
└─────────────────────────────────────────────────────────┘
```

(56) References Cited

U.S. PATENT DOCUMENTS

| | | | |
|---|---|---|---|
| 2012/0317172 | A1 | 12/2012 | Redpath |
| 2013/0238975 | A1* | 9/2013 | Chan .................. G06F 16/9574 |
| | | | 715/234 |
| 2014/0337414 | A1* | 11/2014 | Sojoodi .................. H04W 4/60 |
| | | | 709/203 |

FOREIGN PATENT DOCUMENTS

| | | |
|---|---|---|
| CN | 101938503 | 1/2011 |
| CN | 102054004 | 5/2011 |
| CN | 103957200 A | 7/2014 |
| CN | 104125258 | 10/2014 |
| CN | 104468363 A | 3/2015 |
| CN | 104657118 A | 5/2015 |
| CN | 104811740 | 7/2015 |
| CN | 104917838 A | 9/2015 |
| WO | WO 2014176895 | 11/2014 |

OTHER PUBLICATIONS

European Extended Search Report in European Application No. 16867926.4, dated Apr. 5, 2019, 7 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Intellectual Property Office of Singapore Written Opinion in Singapore Application No. 11201804445V, dated Sep. 9, 2019, 7 pages.

* cited by examiner

PAGE JUMP METHOD AND APPARATUS

This application is a continuation of PCT Application No. PCT/CN2016/106346, filed on Nov. 18, 2016, which claims priority to Chinese Patent Application No. 201510894292.2, filed on Nov. 27, 2015, and each application is hereby incorporated by reference in its entirety

TECHNICAL FIELD

The present application relates to field of communications technologies, and in particular, to a page jump method and apparatus.

BACKGROUND

An application (APP) can provide a user with rapid and stable services such as account recharging services, by using a native page. The native page is independently executable based on local code of the APP that does not rely on HyperText Markup Language (HTML5) code transmitted through a network.

However, when a new service is deployed, and is provided to the user by using a native page, it is possible that the APP may need to be upgraded to a newer version before the service can be provided, which can be inflexible.

SUMMARY

The present application provides a page jump method, where the method includes: obtaining a page identifier of a page to be jumped from; searching a page routing table for a corresponding jump route based on the obtained page identifier, where the jump route includes a mapping relationship between the page identifier and a jump page; and jumping to the jump page based on the identified jump route.

Optionally, the method further includes: periodically sending a first query request to a server, where the first query request is used to trigger the server to deliver the latest jump route; receiving the latest jump route delivered by the server; and updating the page routing table based on the received latest jump route.

Optionally, the method further includes: periodically sending a second query request to the server, where the second query request is used to trigger the server to deliver page data of the latest jump page offline; receiving the page data of the latest jump page delivered by the server offline; and updating a local page database based on the received page data of the latest jump page.

Optionally, the jumping to the jump page based on the identified jump route includes: obtaining a jump page corresponding to the page identifier based on the identified jump route; reading page data of the jump page; and jumping to the jump page, and loading the read page data onto the jump page to complete a jump.

Optionally, the reading page data of the jump page includes: determining whether a local page database stores the page data of the jump page offline; reading the page data of the jump page from the page database when the page database stores the page data of the jump page offline; and requesting the page data of the jump page from a server when the page database does not store the page data of the jump page.

The present application further provides a page jump apparatus, where the apparatus includes: an acquisition module, configured to obtain a page identifier of a page to be jumped from; a searching module, configured to search a page routing table for a corresponding jump route based on the obtained page identifier, where the jump route includes a mapping relationship between the page identifier and a jump page; and a jump module, configured to jump to the jump page based on the identified jump route.

Optionally, the apparatus further includes: a sending module, configured to periodically send a first query request to a server, where the first query request is used to trigger the server to deliver the latest jump route; a receiving module, configured to receive the latest jump route delivered by the server; and an updating module, configured to update the page routing table based on the received latest jump route.

Optionally, the sending module is further configured to: periodically send a second query request to the server, where the second query request is used to trigger the server to deliver page data of the latest jump page offline; the receiving module is further configured to: receive the page data of the latest jump page delivered by the server offline; and the updating module is further configured to: update a page database based on the received page data of the latest jump page.

Optionally, the jump module is configured to: obtain a jump page corresponding to the page identifier based on the identified jump route; read page data of the jump page; and jump to the jump page, and load the read page data onto the jump page to complete a jump.

Optionally, the jump module is further configured to: determine whether a local page database stores the page data of the jump page offline; read the page data of the jump page from the page database when the page database stores the page data of the jump page offline; and request the page data of the jump page from a server when the page database does not store the page data of the jump page.

In the present application, the page identifier of the page to be jumped from is obtained, the page routing table is searched for the corresponding jump route based on the obtained page identifier, and then the corresponding page is jumped to based on the identified jump route, so as to dynamically and flexibly perform the page jump based on the jump route identified from the page routing table, so that a new service can be quickly and flexibly deployed without needing to upgrade a version of an APP.

DESCRIPTION OF IMPLEMENTATIONS

Figure 1:
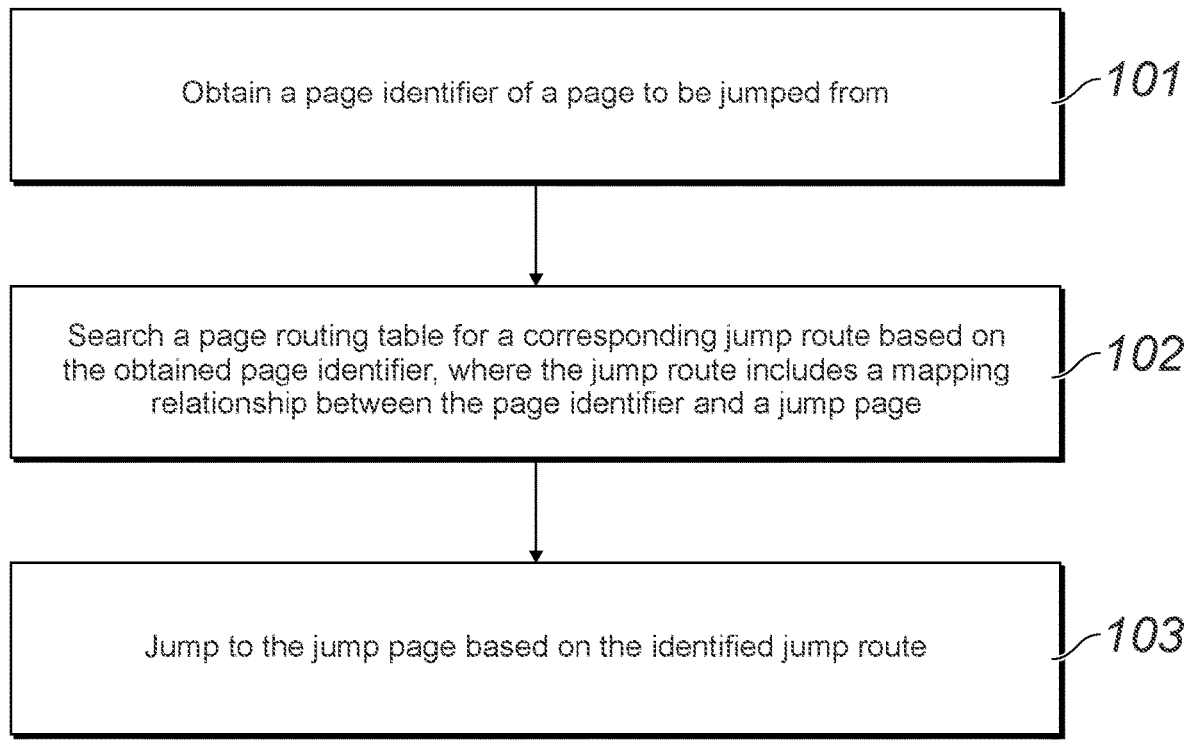
FIG. 1 is a flowchart illustrating an example page jump method, according to an implementation of the present application.

In related technologies, an APP can provide a user with fast and stable services such as account recharge services, by using native pages. However, when a new service is deployed on the APP, such as services operating in a special time period, it is possible that update to the APP may be needed to provide the services. For example, if the services do not need to be run with high stability, and the service is provided for the user by using the native page, the application may need to be updated. In addition, some of the services are temporarily provided. After the operation service ends, the APP can require the user to restore to the original version. As such, the user can be frequently required to update the APP versions, and the user experience can be poor.

In related technologies, the previously noted problem can be resolved by introducing a hybrid technology by mixing the native page and an HTML5 page in the APP. When a new service is deployed on the APP, the APP can download an HTML5 page of the new service deployed on a server to the APP to dynamically replace an original HTML5 page, and then load the HTML5 page to run the new service. However, with this solution, because the native page in the APP usually is not replaced, the HTML5 page in the APP is dynamically replaced only when the new service is deployed on the APP. However, the HTML5 page is less stable than the native page. As the number of HTML5 pages increase in the APP, operation stability of the APP can be affected to cause poor user experience.

Therefore, to improve user experience, the number of HTML5 pages in the APP are reduced. When the new service is deployed on the APP, hard coded jump logic in the APP can be dynamically modified, so that the native page can be jumped to the HTML5 page of the new service, and a service on the native page can be replaced by the new service.

For example, assume that the new service is an operation service on TAOBAO client APP on a special occasion, such as a Holiday or a calendar events when special discounts are applied, such as Singles' Day. During operation of the service, a rich text page that includes a picture, a sound, and a text is loaded onto a home page of the APP. However, this usually cannot be implemented by using a native page of the APP. Therefore, the APP can download, from a server, the rich text page that needs to be displayed. Then, a Lua script can be edited to patch the APP, and hard coded jump logic in the APP can be modified to jump to the rich text page. For example, assume that the original jump logic in the APP jumps from page A to page B, and the rich text page is page C, the Lua script can be edited to modify the hard coded jump logic from jumping from page A to page B, to jumping from page A to page C.

However, to complete a page jump by dynamically modifying the hard coded jump logic in the APP, code of the APP needs to be dynamically modified. Consequently, a certain security risk can exist. For example, after the code of the APP is dynamically modified, the APP can be rejected due to security risks. In addition, to complete the page jump by dynamically modifying the hard coded jump logic in the APP, the APP needs to continuously load the patches, which can be inflexible.

In view of this, the present disclosure provides a page jump method, including: obtaining a page identifier of a page to be jumped from; searching a page routing table for a corresponding jump route based on the obtained page identifier, where the jump route includes a mapping relationship between the page identifier and a jump page; and jumping to a corresponding page based on the identified jump route. As such, a page jump can be dynamically and flexibly performed by using the jump route identified from the page routing table, so that a new service can be quickly and flexibly deployed without needing to update the corresponding APP. In addition, in the present application, when the page jump is performed, jump logic in the APP does not need to be modified. Therefore, the APP will not be rejected due to security risks.

The following describes the present application by using specific implementations and with reference to a specific application scenario.

Referring to FIG. 1, the figure shows an example page jump method according to an implementation of the present application. The method is applied to a client, and the method includes the steps described below.

At 101, a page identifier of a page to be jumped from is obtained. At 102, a page routing table is searched for a corresponding jump route based on the obtained page identifier, where the jump route includes a mapping relationship between the page identifier and a jump page. At 103, a corresponding page is jumped to based on the identified jump route.

In some implementations, the client can be client software that provides a service for a user. For example, the client can be a TABAO client APP. The page identifier of the page to be jumped from can be included in jump logic predetermined in the client, and the jump logic can be hard coded in advance in a program of the client that does not change.

For example, assume that hard coded jump logic in the program of the client is jumping from page A to page B, and a page identifier of page B is viewid1. As such, viewid1 is a page identifier of a page to be jumped from that is included in the jump logic.

The page identifier of the page to be jumped from in the jump logic can correspond to different jump pages in different service scenarios.

In some implementations, a page routing table can be locally pre-created in the client, and the page routing table can be used to store a jump route delivered by a server. A jump route in the page routing table can include the mapping relationship between the page identifier and a jump page.

For different services, the server can deliver different jump routes to the client, so that one page identifier can be associated to different jump pages.

For example, when the client is a TABAO client and the TABAO client executes a routing service, a local page routing table can store a jump route in the following form that corresponds to the routine service:

| Page identifier of a page to be jumped from | Jump page |
| --- | --- |
| viewid1 | page A |

The jump route indicates that when executing the routine service, the client jumps to page A when executing jump logic corresponding to viewid1.

When an operation service on Singles' Day is executed in the TABAO client, a rich text page B that includes a picture, a sound, and a text can be loaded onto a home page of the client. As such, the server can deliver, to the client, a jump route in the following form that corresponds to the operation service:

| Page identifier of a page to be jumped from | Jump page |
| --- | --- |
| viewid1 | page B |

The jump route indicates that when executing the operation service, the client jumps to the rich text page B when executing the jump logic corresponding to viewid1.

In some implementations, a page database can further be locally pre-created in the client, and the page database can be used to store page data of the latest jump page delivered by the server offline.

The client can interact with the server to update the local page routing table and the page database.

Figure 2:
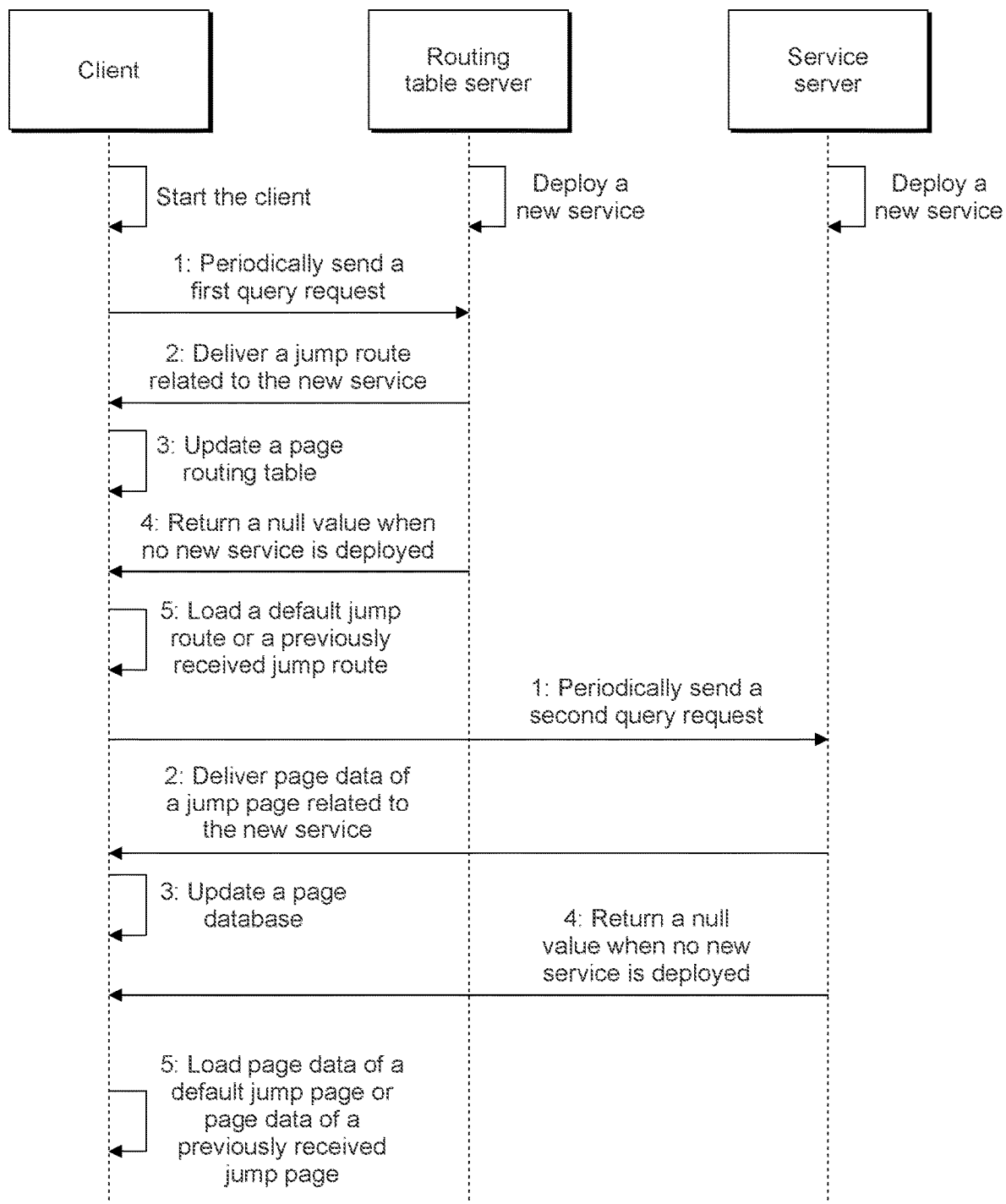
FIG. 2 is a schematic diagram illustrating example interactions between a client and a server, according to an implementation of the present application.

Referring to FIG. 2, the figure shows a schematic diagram illustrating example interactions between a client and a server, according to an implementation.

In this implementation, the server can include a routing table server and a service server.

The routing table server is responsible for interacting with the client to deliver the latest jump route to the client. The service server is responsible for interacting with the client to deliver page data of the latest jump page to the client. In some implementations, the routing table server and the service server are integrated into one server. For example, a function of the routing table server and a function of the service server can be integrated into one physical server.

As shown in FIG. 2, the client can periodically send a first query message to the routing table server, and a time interval is not limited in this implementation. For example, the first query message can be periodically sent to the routing table server once every 15 seconds. The first query message can be used to query whether the routing table server has the latest jump route, and trigger the routing table server to deliver the latest jump route to the client.

A new service can be pre-deployed on the service server. After deployment of the new service is completed, the service server can actively synchronize a jump route related to the new service to the routing table server. After receiving the jump route related to the new service and synchronized by the service server, the routing table server can locally store the received jump route. Alternatively, during implementation, the jump route related to the new service can be directly deployed on the routing table server.

After receiving the first query message sent by the client, the routing table server can determine whether the jump route related to the new service is locally stored. If the jump route related to the new service is locally stored, the routing table server can immediately deliver the latest jump route corresponding to the new service to the client.

The client can send the first query message to trigger the routing table server to deliver the latest jump route to the client. In addition, during implementation, the routing table server can actively deliver, to the client, the jump route related to the new service and synchronized by the service server to the routing table server.

For example, after receiving the jump route related to the new service and synchronized by the service server, the routing table server can be triggered to actively deliver the jump route related to the new service to the client. That is, each time after a new service is deployed on the service server, the routing table server can be triggered to actively deliver a jump route related to the new service to the client.

In addition, to improve security, when the routing table server delivers the latest jump route to the client, the routing table server can further transmit the latest jump route in an encrypted way, or encrypt in advance the latest jump route related to the new service and stored in the background. After receiving the latest jump route delivered by the routing table server, the client can decrypt the received jump route, and then store the jump route in a page routing table to update the page routing table.

Still referring to FIG. 2, if no new service is currently deployed on the service server, and the routing table server does not locally store a jump route related to a new service, the client can obtain no latest jump route by querying. The routing table server can return a null value to the client, indicating that no new service is currently deployed. As such, the client can load, onto the page routing table, a default jump route or a previously received jump route delivered by the routing table server.

As such, it can be ensured that all jump routes stored in the page routing table are the latest jump routes. After a new service is deployed, the client can store, the latest jump route that corresponds to the new service in the page routing table delivered by the routing table server, so as to update the page routing table.

Still referring to FIG. 2, the client can further periodically send a second query message to the service server. The second query message can be used to query whether the service server has the page data of the latest jump page, and trigger the service server to deliver the page data of the latest jump page to the client.

Page data of a jump page related to the new service can be pre-deployed on the service server. After receiving the second query message, the service server can determine whether a new service is currently deployed. If a new service is deployed, the service server can immediately deliver page data of the latest jump page corresponding to the new service to the client offline. For example, the service server can deliver the page data of the latest jump page to the client by using (or in form of) an offline data packet.

The client can send the second query message to trigger the service server to send the page data of the latest jump page to the client. In addition, during implementation, the service server can actively deliver the page data of the latest jump page related to the new service to the client.

For example, after the new service is deployed on the service server, the service server can be triggered to actively deliver the page data of the latest jump page related to the new service to the client. That is, each time after a new service is deployed on the service server, the service server can be triggered to actively deliver page data of the latest jump page related to the new service to the client.

In addition, to improve security, when delivering the page data of the latest jump page to the client offline, the service server can further transmit the page data of the latest jump page in an encrypted way, or encrypt in advance the page data of the latest jump page related to the new service and stored in the background. After receiving the page data of the latest jump page delivered by the service server, the client can decrypt the received page data of the latest jump page, and then store the page data of the latest jump page in a page database to update the page database.

Still referring to FIG. 2, if no new service is deployed on the service server, the client can obtain no page data of the latest jump page by querying, and the service server can return a null value to the client, indicating that no new service is currently deployed. As such, the client can load, onto the page database, page data of a default jump page or the latest page data of a jump page delivered by the service server.

As such, it can be ensured that all page data stored in the page database are page data of the latest jump page. After jump data of a jump page related to a new service is deployed on the service server, the client can store page data of the latest jump page corresponding to the new service delivered by the service server to the page database, so as to update the page database.

With reference to FIG. 2, a previously described a process in which the client interacts with the server to update a locally created page routing table and a locally created page database.

The following describes a process in which the client completes a page jump of a new service based on the local page routing table and the local page database.

In some implementations, when performing the page jump, the client can still complete the page jump by executing specified jump logic.

The client can be triggered by monitoring a foreground operation of a user, to execute the specified jump logic.

In an application that can be displayed, a corresponding jump control can be provided on an operation interface of the client in advance. For example, the jump control can include a jump button, a jump link, etc. When the user performs a corresponding service operation on the operation interface of the client, the client can monitor a trigger event of the user on the jump control on the operation interface of the client in real time. For example, the client is loaded onto a touchscreen terminal, and the trigger event can be a click event on the jump control. When the trigger event on the jump control on the operation interface of the client is monitored, the client can be triggered to invoke and execute the specified jump logic, so as to complete the corresponding page jump.

In addition, it is worthwhile to note that the specified jump logic described in the present implementations is different from jump logic in prior implementations as to certain details.

For example, in some prior implementations, jump logic specified in a client may include only a predetermined page to be jumped from. After executing the jump logic, the client can directly jump to a corresponding jump page based on the page to be jumped from specified in the jump logic, so as to complete the jump.

However, in implementations of the present disclosure, in addition to a page identifier of a predetermined page to be jumped from, the jump logic specified in the client can include searching logic for searching in the page routing table for a corresponding jump route based on the page identifier of the page to be jumped from.

When executing the specified jump logic, the client can first read from the jump logic the page identifier of the page to be jumped from, and then search the page routing table for the corresponding jump route based on the page identifier of the page to be jumped from, and then complete the page jump based on the identified jump route after identifying the corresponding jump route.

In some implementations, after the client identifies the corresponding jump route by searching the page routing table based on the page identifier of the page to be jumped from, if a new service is currently deployed on the service server, each jump route stored in the page routing table is the latest jump route. As such, the jump route that corresponds to the page identifier and that is identified by the client is the latest jump route corresponding to the new service.

If no new service is deployed on the server, a jump route stored in the page routing table is still a pre-stored default jump route, or the latest jump route delivered by the routing table server.

As such, after the client identifies the latest jump route from the page routing table, the client can read the latest jump route corresponding to the page to be jumped from, and obtain a jump page. The jump page is corresponding to the page identifier of the page to be jumped from and is obtained based on a mapping relationship between the page identifier of the page to be jumped from and a jump page and is stored in the latest jump route. As such, the obtained jump page can be a jump page related to a new service.

After obtaining the jump page corresponding to the page identifier of the page to be jumped from, the client can jump to the jump page, and load, onto the jump page, page data that corresponds to the jump page and that is read from the local page database, so as to complete the page jump.

The jump page corresponding to the page identifier of the page to be jumped from can be a native page of an APP or can be an HTML5 page. This is not limited in this implementation. For example, in some implementations, a jump route delivered by the server can implement a page jump between a native page and an HTML5 page without any limitation.

In some implementations, when reading the page data corresponding to the jump page from the local page database, the client can search the page database for the corresponding page data by using a page identifier of the latest jump page as an index, so as to determine whether the local page database stores the page data corresponding to the latest jump page.

If the corresponding page data is identified, the client can determine that the local page database stores the page data corresponding to the latest jump page offline. As such, the client can directly read the page data from the local page database.

If the client determines that the page database does not include the page data corresponding to the latest jump page offline, the client can request the page data of the latest jump page from the server. For example, the client can send, to the server, a page data acquisition request that includes a URL address or another identifier of the jump page, to request page data of the jump page from the server.

When the client directly reads the page data corresponding to the latest jump page from the local page database, the page data is page data of a new service deployed on the server, and the client can load the read page data of the new service onto the latest jump page, so as to complete the page jump. After the client completes the page jump based on the read page data of the new service, the client starts to execute the new service deployed on the server.

It is worthwhile to note that when loading the page data of the new service onto the latest jump page, the client can transmit the page data by using a protocol, for example, by using an agreed protocol interface.

In some implementations, if another new service further needs to be deployed on the server, a new jump route can be sent to the client to trigger the client to execute a specified jump logic to jump to a jump page of the new service, so as to execute the new service.

If execution of the new service deployed on the server is completed, and no other new service is deployed on the server, the server can further send, to the client, a trigger message that triggers the client to restore a routine service. After receiving the trigger message, the client can separately restore the local page routing table and the local page database by using the default jump route and the page data of the default jump page. When restoring succeeds, the client executes the same jump logic again, and then jumps to the default page to execute the routine service.

As such, when a new service is deployed on the server, by interacting with the server, the client can store a jump route of the new service in the local page routing table immediately, and store page data of a jump page of the new service in the local page database.

Therefore, after executing corresponding jump logic, the client can read from the jump logic a page identifier of a page to be jumped from, and search the local page routing table for the latest jump route corresponding to the jump logic of the page identifier. After identifying the corresponding latest jump route, the client can read a corresponding jump page from the latest jump route, read page data of the jump page from the local page database, and jump to the corresponding page based on the read page data.

During the whole process, the page identifier of the page to be jumped from in the jump logic does not change, the server can dynamically deliver a new jump route, so that the page identifier of the page to be jumped from dynamically corresponds to different jump pages. Therefore, a service can be more flexibly deployed on the server without needing to update the APP to a different version.

In addition, in the present disclosure, when the client performs the page jump, the page jump is implemented by dynamically delivering a jump route by the server, and jump logic in the APP does not need to be modified. Therefore, the APP does not need to continuously load patches, which makes it more flexible. In addition, because the jump logic in the APP is not modified any more, the APP will not face a risk of being rejected due to security risks.

The following describes the technical solutions in some of the previously described implementations by using an example application.

In this example, the client is a TAOBAO client. When the TAOBAO client executes a routine service, a local page routing table can store a jump route (as shown in in Table 1) that corresponds to the routine service:

TABLE 1

| Page identifier of a page to be jumped from | Jump page |
| --- | --- |
| viewid1 | page A |

The jump route indicates that when executing the routine service, the client jumps to page A when executing jump logic corresponding to viewid1.

In addition, a local page database can also correspondingly store page data of page A.

Assume that a new service is deployed on the server, and the new service is an operation service in the Singles' Day. The client can periodically send the first query message and the second query message to the server, so as to trigger the server to deliver a jump route of the new service and page data of a jump page corresponding to the jump route to the client.

When the client executes the new service, a rich text page B that, for example, includes a picture, a sound, and a text is to be loaded onto a home page of the client. As such, the server can deliver a jump route (as shown in Table 2) that corresponds to the operation service, to the client.

TABLE 2

| Page identifier of a page to be jumped from | Jump page |
| --- | --- |
| viewid1 | page B |

The jump route indicates that when executing the operation service, the client jumps to the rich text page B when executing the jump logic corresponding to viewid1. As such, jump logic in the client does not change. Rather, and a jump page corresponding to a page identifier of a page to be jumped from specified in the jump logic changes.

After receiving the jump route of the new service delivered by the server as shown in Table 2, the client can update, by using the jump route of the new service, the jump route that corresponds to the routine route and that is stored in the local page routing table as shown in Table 1.

In addition, the server can further send page data of page B to the client. After receiving the page data of page B, the client can update the page data of page A stored in the local page database.

When both the local page routing table and the local page database are updated, the client executes the same jump logic again. After reading viewid1 from the jump logic, the client can identify the jump page B corresponding to viewid1 from the local page routing table. After identifying page B, the client can jump to page B, read the page data of page B from the page database, load the read page data of page B onto page B, and then jump to page B. It can be seen that during the whole process, a process of delivering a jump route of a new service is completely unperceived by the user. This helps to improve user experience.

When execution of the new service is completed, if a second new service is redeployed on the server, the server can deliver a jump route of the second new service to the client again in the same way. If execution of the new service is completed, and no other new service is deployed on the server, the server can also send, to the client, a trigger message that triggers the client to restore a routine service. After receiving the trigger message, the client can restore the jump route shown in Table 1 from the jump route stored in the local page routing table and shown in Table 2. In addition, after receiving the trigger message, the client can further restore the page data of page A from the page data of page B stored in the local page database. When restoring is completed, the client executes the same jump logic again, and then jumps to page A to execute the routine service.

In the previously described implementations, the page identifier of the page to be jumped from is obtained, the page routing table is searched for the corresponding jump route based on the obtained page identifier, and then the corresponding page is jumped to based on the identified jump route. Accordingly, page jump is dynamically and flexibly performed based on the jump route identified from the page routing table. As such, the new service can be quickly and flexibly deployed without needing to upgrade the version of the APP. In addition, in the present disclosure, when the page jump is performed, the jump logic in the APP does not need to be modified. Therefore, the APP will not face a risk of being rejected due to the security risk.

Corresponding to the previously described method implementation, the present application further provides apparatus implementations.

Figure 3:
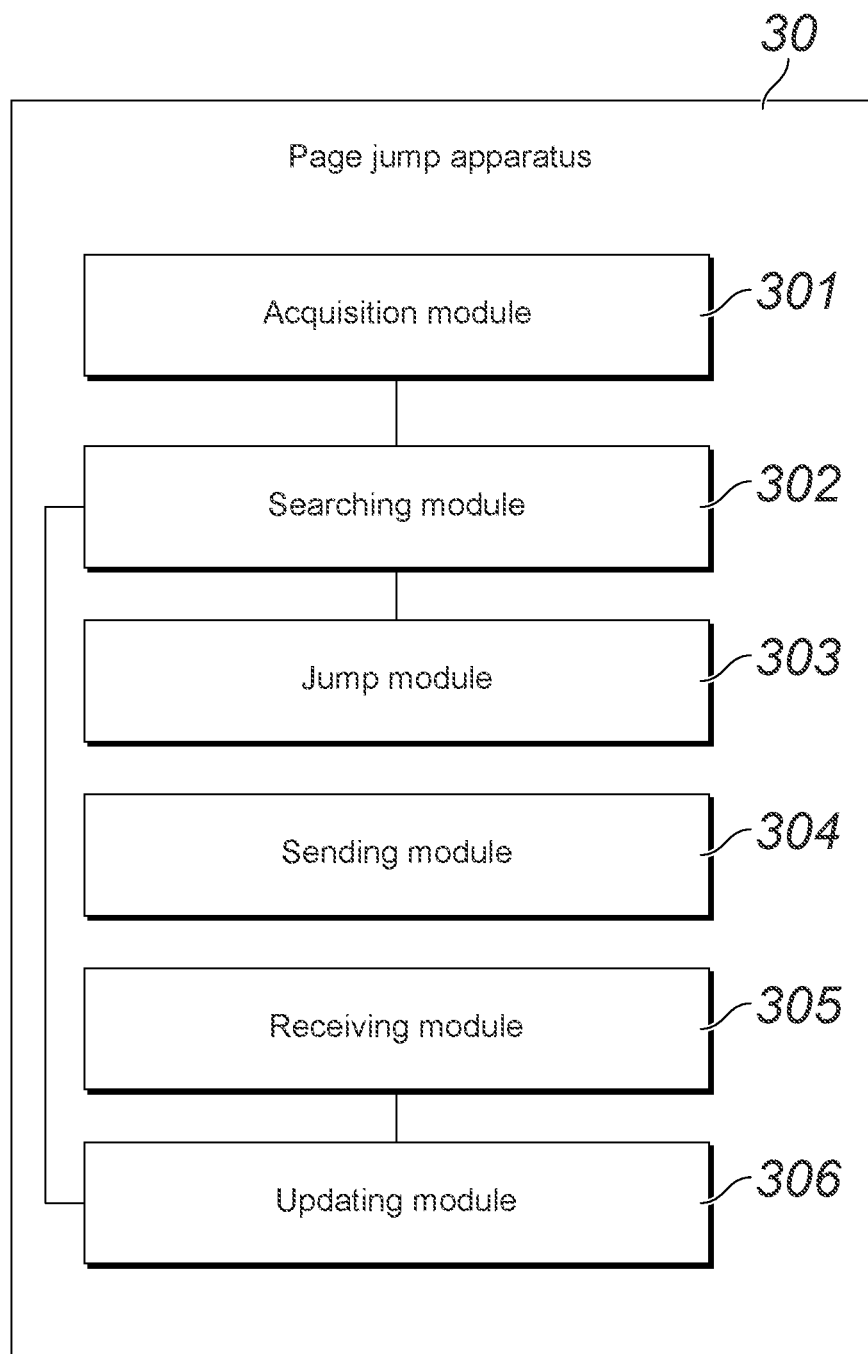
FIG. 3 is a logical block diagram illustrating an example page jump apparatus, according to an implementation of the present application.
Figure 4:
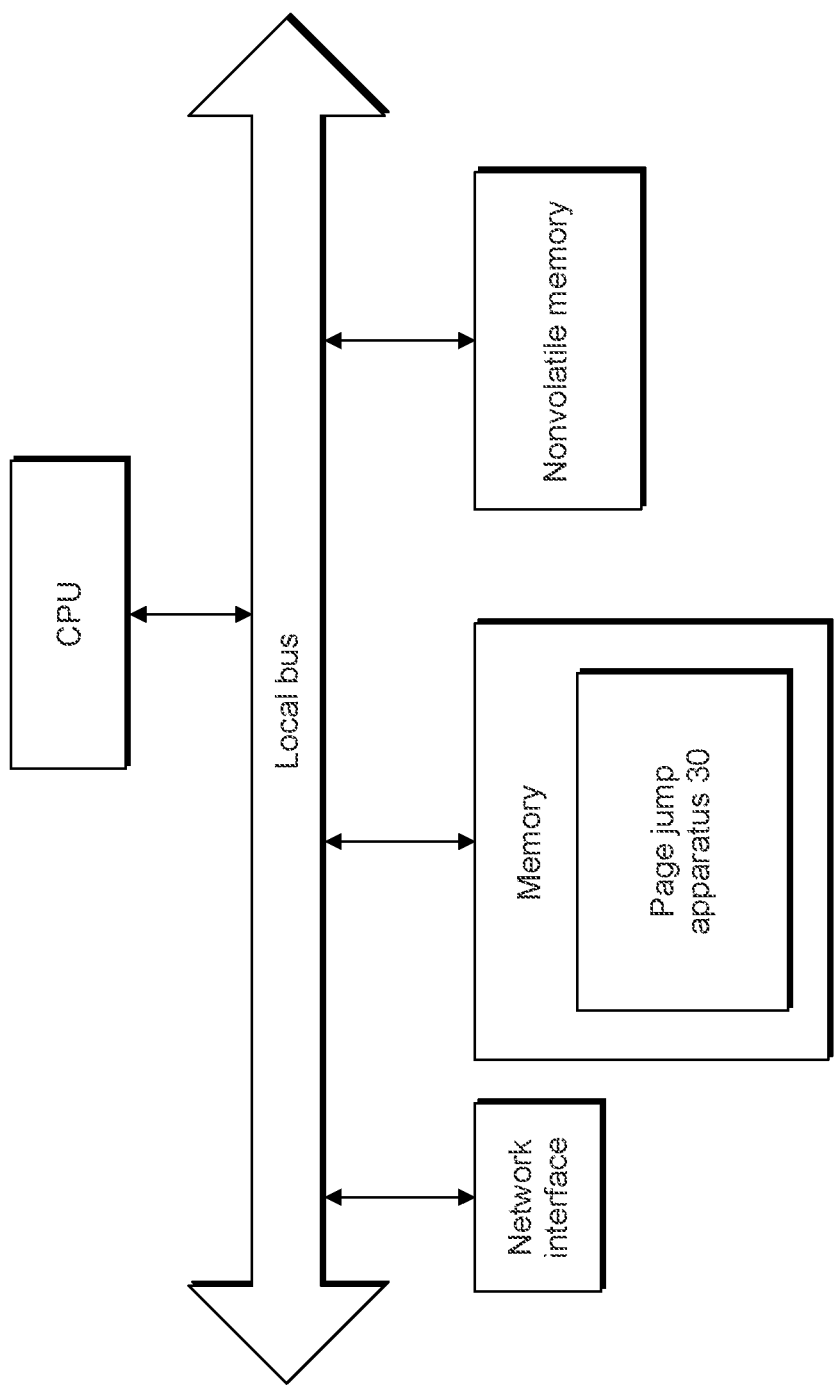
FIG. 4 is a structural diagram of hardware illustrating an example server that includes a page jump apparatus, according to an implementation of the present application.

FIG. 3 depicts an example page jump apparatus 30, applied to a client. FIG. 4 illustrates an example server that includes a page jump apparatus, according to an implementation of the present application. Referring to FIG. 4, a hardware architecture related to the client that includes the page jump apparatus 30 can include a CPU, a memory, a nonvolatile memory, a network interface, a local bus, etc. For example, during software implementation, the page jump apparatus 30 can be understood as a logical apparatus that combines software and hardware and that is formed after a computer program loaded into memory runs in the CPU. The apparatus 30 includes: an acquisition module 301, a searching module 302, and a jump module 303. The acquisition module 301 is configured to obtain a page identifier of a page to be jumped from. The searching module 302 is configured to search a page routing table for a corresponding jump route based on the obtained page identifier, where the jump route includes a mapping relationship between the page identifier and a jump page. The jump module 303 is configured to jump to the jump page based on the identified jump route. In some implementations, the page identifier of the page to be jumped from can be included in jump logic predetermined in the client, and the jump logic can be hard coded in advance in a program of the client that does not change.

The page identifier of the page to be jumped from in the jump logic can separately correspond to different jump pages in different service scenarios.

In some implementations, the apparatus 30 further includes: a sending module 304, a receiving module 305, and an updating module 306. The sending module 304 is configured to periodically send a first query request to a server, where the first query request is used to trigger the server to deliver the latest jump route. The receiving module 305 is configured to receive the latest jump route delivered by the server. The updating module 306 is configured to update the page routing table based on the received latest jump route.

In some implementations, a page routing table can be locally pre-created in the client, and the page routing table can be used to store the jump route delivered by the server. A jump route in the page routing table can include the mapping relationship between the page identifier and a jump page. For different services, the server can deliver different jump routes to the client, so that one page identifier separately corresponds to different jump pages.

The client can interact with the server by sending the first query request to the server, so as to update the local page routing table.

Optionally, the sending module 304 is further configured to: periodically send a second query request to the server, where the second query request is used to trigger the server to deliver page data of the latest jump page offline; the receiving module 305 is further configured to: receive the page data of the latest jump page delivered by the server offline; and the updating module 306 is further configured to: update a page database based on the received page data of the latest jump page.

In some implementations, a page database can further be locally pre-created in the client, and the page database can be used to store page data of the latest jump page delivered by the server offline.

The client can interact with the server by sending the second query request to the server, so as to update the local page routing table.

In some implementations, the jump module 303 is configured to: obtain a jump page corresponding to the page identifier based on the identified jump route; read page data of the jump page; and jump to the jump page, and load the read page data onto the jump page to complete a jump.

In some implementations, when performing a page jump, the client can still complete the page jump by executing specified jump logic. In an application that can be displayed, a corresponding jump control can be provided on an operation interface of the client in advance. For example, the jump control can include a jump button, a jump link, etc. When the user performs a corresponding service operation on the operation interface of the client, the client can monitor a trigger event of the user on the jump control on the operation interface of the client in real time. For example, the client is loaded onto a touchscreen terminal, and the trigger event can be a click event on the jump control. When the trigger event on the jump control on the operation interface of the client is monitored, the client can immediately be triggered to invoke and execute the specified jump logic, so as to complete the corresponding page jump.

After the client identifies the corresponding jump route by searching the page routing table based on the page identifier of the page to be jumped from, if a new service is currently deployed on the service server, each jump route stored in the page routing table is the latest jump route. As such, the jump route that corresponds to the page identifier and that is identified by the client is the latest jump route corresponding to the new service.

As such, after the client identifies the latest jump route from the page routing table, the client can read the latest jump route, obtain a jump page corresponding to the page identifier of the page to be jumped from based on a mapping relationship between the page identifier of the page to be jumped from and a jump page and stored in the latest jump route, jump to the jump page, and load, onto the jump page, page data that corresponds to the jump page and that is read from the local page database, so as to complete the page jump.

In some implementations, the jump module 303 is further configured to: determine whether a local page database stores the page data of the jump page offline; read the page data of the jump page from the page database when the page database stores the page data of the jump page offline; and request the page data of the jump page from a server when the page database does not store the page data of the jump page.

In some implementations, when reading the page data corresponding to the jump page from the local page database, the client can search the page database for the corresponding page data by using a page identifier of the latest jump page as an index, so as to determine whether the local page database stores the page data corresponding to the latest jump page.

If the corresponding page data is identified, the client can determine that the local page database stores the page data corresponding to the latest jump page offline. As such, the client can directly read the page data from the local page database.

If the client determines that the page database does not store the page data corresponding to the latest jump page offline, the client can request the page data of the latest jump page from the server. For example, the client can send, to the server, a page data acquisition request that includes a URL address or another identifier of the jump page, to request the page data of the jump page from the server.

When the client directly reads the page data corresponding to the latest jump page from the local page database, the page data is page data of a new service deployed on the server, and the client can load the read page data of the new service onto the latest jump page, so as to complete the page jump.

A person skilled in the art can easily figure out other implementation solutions of the present disclosure after considering the specification and practicing the disclosure disclosed here. The present disclosure is intended to cover variations, functions, or adaptive changes of the present disclosure. These variations, functions, or adaptive changes comply with general principles of the present disclosure, and include common knowledge or commonly used technical means in the technical field not explicitly disclosed in the present disclosure. The specification and the implementations presented in the present disclosure are merely considered as examples.

It should be understood that the present disclosure is not limited to the exact structures described above and shown in the accompanying drawings, and modifications and changes can be made without departing from the scope of the present application.

The previously provided descriptions are merely example implementations of the present application, and are not intended to limit the present application. Any modification, equivalent replacement, or improvement made without departing from the spirit and principle of the present application should fall within the protection scope of the present application.

Figure 5:
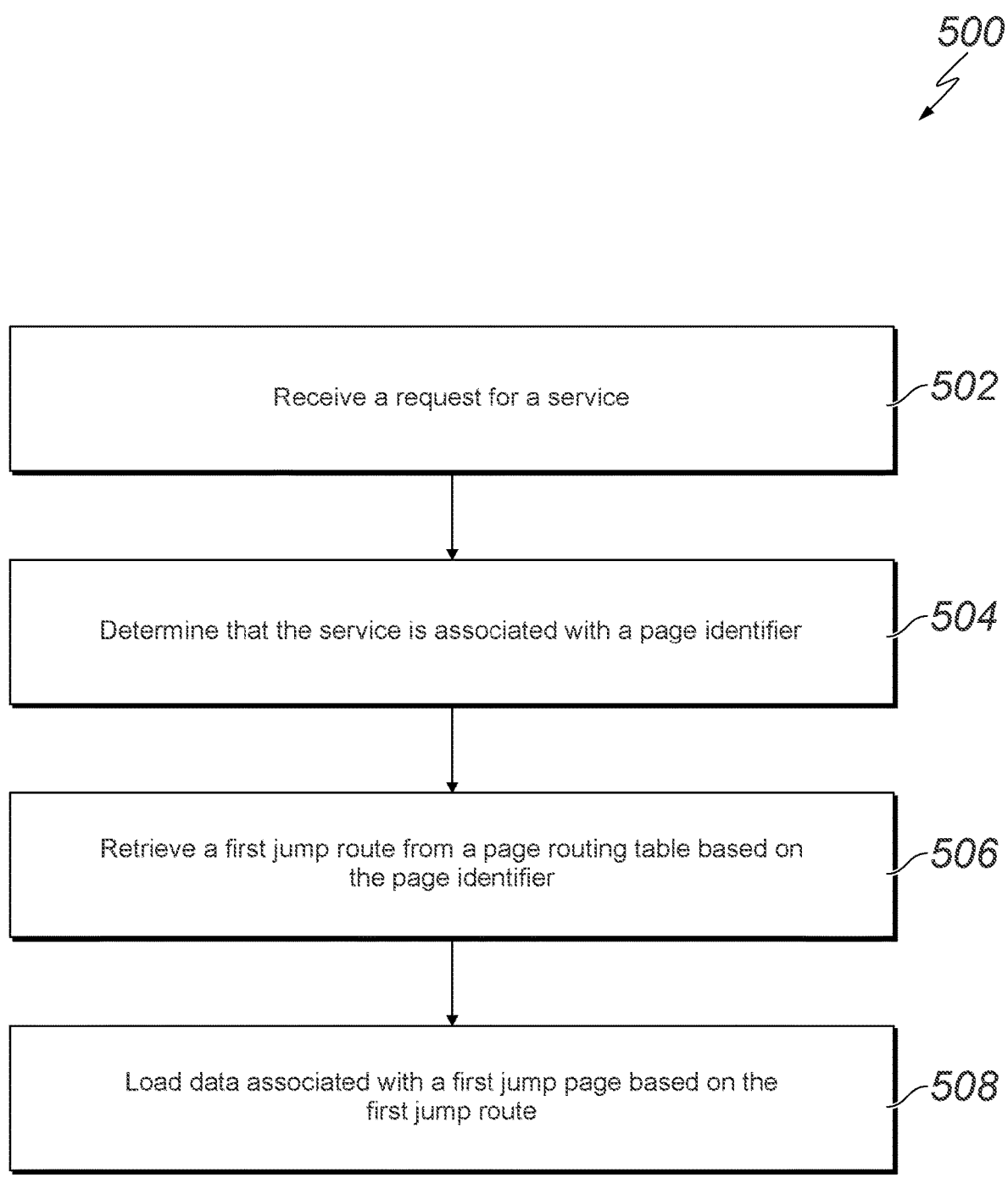
FIG. 5 is a flowchart illustrating an example of a computer-implemented method for page jumping, according to implementations of the present disclosure.

FIG. 5 is a flowchart illustrating an example of a computer-implemented page jump method 500, according to implementations of the present disclosure. The method 500 can be performed at a client side, for example, by the page jump apparatus 30 of FIG. 3. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, a request for a service is received. For example, the request can be received by one or more processors at a client application (can also be referred to as "the client" or "the application"). The request can be received from a user, or from a system (for example an application). For example, a user may interact with an application and request the service, or an application may request the service while performing a function. For example, a service can be moving from a page A (e.g., a shopping list) to a page B (e.g., a check out page). From 502, method 500 proceeds to 504.

At 504, a page identifier associated with the service is determined. For example, the service can be associated with a page that is identified by the page identifier. In some implementations, a jump logic of the client associates the service to the page (or the page identifier). For example, the jump logic can be hard coded in the client. For example, the jump logic can set the page (or the page identifier) as a default response to a request for the service. In some examples, the jump logic of a client cannot be changed. In some implementations, an application on the client can request different services, and different services can be associated to different pages and/or page identifiers. From 504, method 500 proceeds to 506.

At 506, a first jump route is retrieved from a page routing table; the first jump route is retrieved based on the page identifier. The page routing table stores mapping relationships between one or more page identifiers and one or more jump pages. An example of a jump page includes, but is not limited to, a webpage. The first jump route includes a mapping relationship between the page identifier and a first jump page, and is stored in the page routing table. The first jump page includes data that is to be provided in response to receiving the request to the service. For example, an application may submit a request to a shopping service, and in response, the client may retrieve the first jump route to a webpage (as the first jump page) that provides the shopping service, from the page routing table. The first jump route can include an address associated with the first jump page. For example, the first jump route can be an IP address, a URL, etc. In some implementations, the page routing table is a local page routing table. For example, the local page routing table can be located at the client, or can be specific to the client. In some examples, the local page routing table is associated with a database to which client is in direct communication. From 605, method 500 proceeds to 508.

At 508, data associated with a first jump page is loaded; the data is loaded based on the first jump route. For example, the data (e.g., page data) of the first jump page can be stored in a page database, or can be provided by a server, and the first jump route can provide an address to where the data is stored, or to the server that provides the data. For example, the data of the first jump page can be loaded by retrieving the data from the databased, or by requesting the data from the server.

In some implementations, the client application includes (or is in communication with) a local page database. The local database can include data of one or more jump pages associated with one or more jump routes that are included in the page routing table. For example, the local page database can include data page associated with the first jump page. In an example, the client receives the request for the service (502), determines a page identifier associated with the service (504), retrieves the first jump route associated with the page identifier from the page routing table (506), and loads the page data of the first page from the local page database based on the first jump route. The local page database can be a database located at the client, or can be specific to the client. In some examples, the local page database is a database to which client is in direct communication.

In some implementations, in response to retrieving the first jump route, the client determines whether the local page database includes data of the first jump page. If the local page database includes the data of the first jump page, the client loads the page data of the first jump page from the page database. If the local database does not include the data of the first jump page, the client requests the page data of the first jump page from the server. In some examples, in response to receiving the page data of the first jump page from the server, the client updates the local page database to include the first jump page.

In some implementations, the jump page associated with a service can change over time. For example, a webpage associated with a shopping service may change based on one or more services (e.g., discounts, shipping fee, etc.) deployed on the webpage at different times of a year. Accordingly, when the shopping service is requested, data associated with the webpage (e.g., page data) may differ based on the services deployed on the jump page at the time of request.

In some implementations, a server monitors services deployed on one or more jump pages and communicates the changes on the jump pages to the client. For example, the server may send a second jump route to the client in response to determining that a new service has been deployed on the first jump page. The second jump route can be an address to a second jump page that reflects the newly deployed service on the first jump page. The client can then load data associated with the second jump page based on the second jump route.

In some implementations, once the server detects a newly deployed service, the server automatically sends a respective second jump route to the client. In some examples, the server communicates the second jump route (or second jump page) to a list of clients that had previously requested and/or used the first jump route (or first jump page). For example, the server can determine the list of the clients based on a history of the jump pages transmitted to the clients, or based on the applications in communication with each client. In some implementations, the client periodically sends a query to the server to trigger the server to transmit the second jump route in case that a new service has been deployed on a respective jump page. In some implementations, upon receiving the request for the service, determining the page identifier associated with the service, and/or retrieving the first jump route from the routing table, the client sends a query to the server inquiring whether the first jump page has been changed since last time that the client loaded the first jump page. If a change has been made (e.g., a new service has been deployed on the first jump page) the server provides the second jump route and/or the second jump page to the client. If no changes has been made, the server may indicate that the first jump page is still valid (e.g., the server can return a null value to the client), and the client uses the first jump route to load the first jump page.

In some implementations, the server stores the second jump route based on a mapping relationship between the second jump page (or the second jump route) and the first jump page (or the first jump route). In some implementations, the second jump route includes a mapping relationship between the page identifier (associated with the requested service) and the second jump page.

In some implementations, in response to receiving the second jump route (or the second jump page), a local page routing table of the client is updated to include the second jump route. The updated local page routing table includes the second jump route as a mapping relationship between the page identifier (associated with the requested service) and the second jump page.

Implementations of the present disclosure are to solve technical problems in updating client applications in response to newly deployed services. Traditionally, when a new service is deployed on an application, the application is updated to comply with the deployed service. For example, the hard code of the application may be edited from jumping from page A to page B, to jumping from page A to page C, to comply with a newly developed service that is provided in page C. However, the new services may be deployed for short periods of time, causing frequent changes of the application. In addition, frequent changes of the hard code of the application can rise to security risks.

Implementations of the present disclosure provide methods and systems for providing up-to-date services to the client applications without making any changes to the hard code of the application. According to the present implementations, changes into the services of an application are reflected in a page routing table rather than in the hard code of the application. Each service (e.g., jumping from page A to page B) is associated with a page, which has a page identifier in the hard code of the application (e.g., page B may be associated with a page identifier). The page routing table maps the page identifiers (associated with the services) to one or more jump routes. Each jump route includes a relationship between the respective page identifier and a jump page. The jump page reflects the changes in the respective service. To receive up-to-date services, the application loads the jump page based on the jump route retrieved from the page routing table. For example, referring to the example of the preceding paragraph, the jump page can be page C, and the jump route can be an address to page C. Further, the page routing table can be updated to include jump routes to new jump pages that reflect the newly deployed services.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method executed by one or more processors, the method comprising:
   receiving, by the one or more processors, a request for a service;
   determining, by the one or more processors, a page identifier associated with the service, wherein the page identifier is an identifier of a first jump page;
   retrieving, by the one or more processors, a first jump route from a local page routing table based on the page identifier, wherein the first jump route provides an online route for online retrieving of the first jump page from a first server;
   in response to determining the first jump route, sending a query to a second server, the query inquiring whether the first jump route is a latest jump route associated with the service;
   receiving, from the second server, a first message indicating that the first jump route is the latest jump route; and
   in response to receiving the first message, loading, by the one or more processors, the first jump page based on the first jump route.

2. The method of claim 1, further comprising:
   receiving, by the one or more processors and from the second server, a second message including a second jump route as the latest jump route associated with the page identifier;
   in response to receiving the second message, updating, by the one or more processors, the local page routing table to include the second jump route; and
   loading a second jump page based on the second jump route.

3. The method of claim 2, wherein the second jump page is loaded from the first server and based on the second jump page.

4. The method of claim 2, wherein the second server is configured to transmit the second jump route based on a new service associated with the page identifier and deployed by the first server.

5. The method of claim 1, wherein the one or more processors are associated with a client computing system and the local page routing table is specific to the client computing system.

6. The method of claim 1, wherein loading the first jump page comprises:
   determining, by the one or more processors, that page data of the first jump page is stored in a page database that is in communication with the one or more processors, and in response, retrieving the page data from the page database.

7. The method of claim 6, further comprising:
receiving, by the one or more processors, the page data of the first jump page from the first server; and
updating, by the one or more processors, the page database to include the page data of the first jump page.

8. The method of claim 1, wherein loading the first jump page comprises:
determining, by the one or more processors, that a local page database lacks page data of the first jump page, and in response, requesting the page data from a server, wherein the local page database is configured to store page data of the first jump page.

9. A non-transitory, computer-readable medium storing one or more instructions executable by a computer system to perform operations comprising:
receiving a request for a service;
determining a page identifier associated with the service, wherein the page identifier is an identifier of a first jump page;
retrieving a first jump route from a local page routing table based on the page identifier, wherein the first jump route provides an online route for online retrieving of the first jump page from a first server;
in response to determining the first jump route, sending a query to a second server, the query inquiring whether the first jump route is a latest jump route associated with the service;
receiving, from the second server, a first message indicating that the first jump route is the latest jump route; and
in response to receiving the first message, loading the first jump page based on the first jump route.

10. The method of claim 9, further comprising one or more instructions executable to perform:
receiving from the second server, a second message including a second jump route as the latest jump route associated with the page identifier;
in response to receiving the second message, updating the local page routing table to include the second jump route; and
loading a second jump page based on the second jump route.

11. The method of claim 10, wherein the second jump page is loaded from the first server and based on the second jump page.

12. The method of claim 10, wherein the second server is configured to transmit the second jump route based on a new service associated with the page identifier and deployed by the first server.

13. The method of claim 9, wherein the one or more processors are associated with a client computing system and the local page routing table is specific to the client computing system.

14. The method of claim 9, wherein loading the first jump page comprises:
determining that page data of the first jump page is stored in a page database, and in response, retrieving the page data from the page database.

15. The method of claim 14, further comprising one or more instructions executable to perform:
receiving the page data of the first jump page from the first server; and
updating the page database to include the page data of the first jump page.

16. The method of claim 9, wherein loading the first jump page comprises:
determining that a local page database lacks page data of the first jump page, and in response, requesting the page data from a server, wherein the local page database is configured to store page data of the first jump page.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving a request for a service;
determining a page associated with the service, wherein the page is associated with a page identifier;
retrieving a first jump route from a local page routing table based on the page identifier, wherein the first jump route provides an online route for online retrieving of the first jump page from a first server;
in response to determining the first jump route, sending a query to a second server, the query inquiring whether the first jump route is a latest jump route associated with the service;
receiving, from the second server, a first message indicating that the first jump route is the latest jump route; and
in response to receiving the first message, loading the first jump page based on the first jump route.

18. The method of claim 17, is further configured to:
receive, from the second server, a second message including a second jump route as the latest jump route associated with the page identifier;
in response to receiving the second message, update the local page routing table to include the second jump route; and
loading a second jump page based on the second jump route.

19. The method of claim 18, wherein the second jump page is loaded from the first server and based on the second jump page.

20. The method of claim 17, wherein loading the first jump page comprises:
determining that page data of the first jump page is stored in a page database, and in response, retrieving the page data from the page database.

* * * * *

UNITED STATES PATENT AND TRADEMARK OFFICE
CERTIFICATE OF CORRECTION

PATENT NO.        : 10,594,765 B2                              Page 1 of 1
APPLICATION NO.   : 15/989678
DATED             : March 17, 2020
INVENTOR(S)       : Yueyang Zheng It is certified that error appears in the above-identified patent and that said Letters Patent is hereby corrected as shown below:

In the Specification

Column 1, Line 7, after "entirety" insert -- . --.

Signed and Sealed this
Twelfth Day of May, 2020

Andrei Iancu
*Director of the United States Patent and Trademark Office*